Patented Oct. 23, 1923.

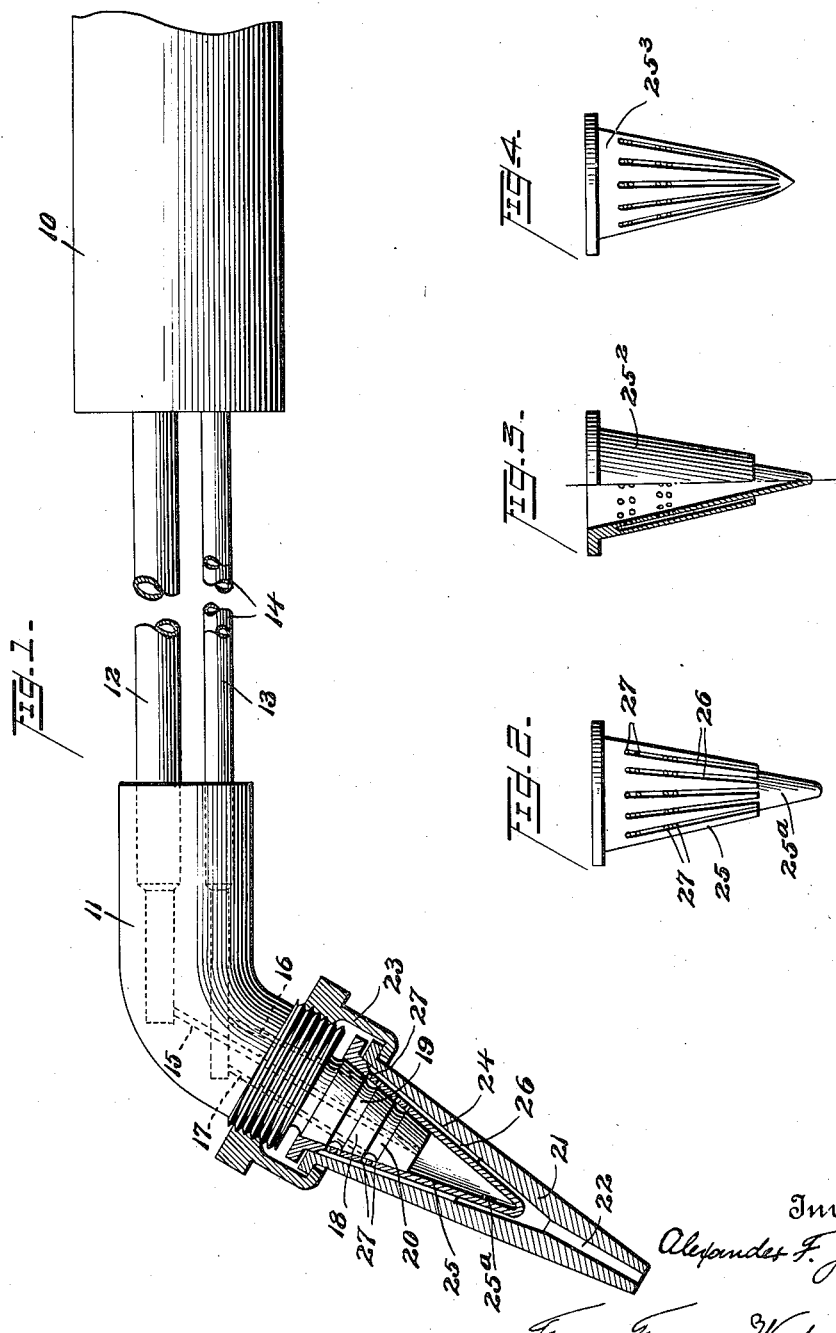

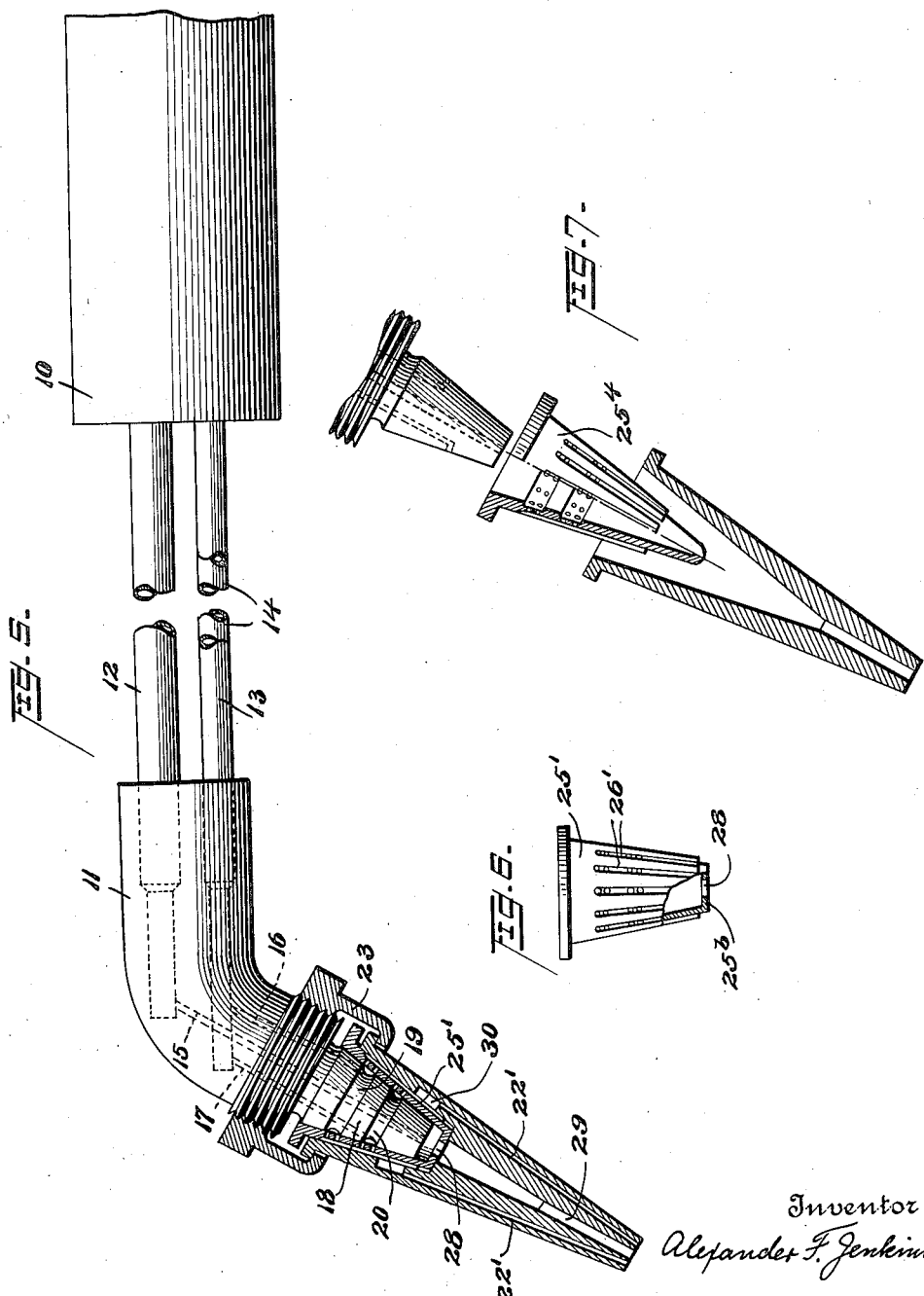

1,471,694

UNITED STATES PATENT OFFICE.

ALEXANDER F. JENKINS, OF BALTIMORE, MARYLAND.

WELDING AND CUTTING TORCH.

Application filed December 6, 1919. Serial No. 343,062.

*To all whom it may concern:*

Be it known that I, ALEXANDER F. JENKINS, a citizen of the United States, and residing at Baltimore city, State of Maryland, have invented certain new and useful Improvements in Welding and Cutting Torches, of which the following is a specification.

The object of this invention is to provide an oxy-acetylene welding and cutting torch having an improved gas mixing tip which is capable of intimately mixing large quantities of combustible and combustion supporting gases. It has been found in practice that in torches employed in heating large objects and involving the use, within a short period of time, of large quantities of gases under high pressure, that an intimate mixture of the combustible and combustion supporting gases, usually acetylene and oxygen respectively, does not take place, and the efficiency of the heating flame is, therefore, much reduced. The present invention consists in the addition to the ordinary torch body and head, of a special two-part mixing tip constructed and designed to handle large flows of gas, and to insure the complete and intimate mixture thereof before delivery to the orifice where the mixture is burned.

Several alternative forms of the invention are disclosed in the following description, in connection with the accompanyng drawings, in which—

Fig. 1 is a side view of a common form of torch adapted for cutting and welding purposes, and showing my improved tip in section, the tip illustrated being a welding tip;

Fig. 2 is a side view of the mixing member of the tip shown in section in Figure 1;

Fig. 3 is a view of a modified form of mixing member, part being shown in section and part in elevation;

Fig. 4 is a side view of another form of the hollow cone member;

Fig. 5 is a side view of a cutting and welding torch with a cutting tip attached thereto, the latter being shown in section;

Fig. 6 is a side elevation to the mixing member shown in section in Figure 5, partly being broken away; and Fig. 7 is a disassembled view of portion of the head of a welding torch and a modified form of two part welding tip, the tip proper being shown in section and the mixing part in section and part in elevation.

Connecting the body 10 and the head 11 of the torch shown in Figure 1, are three pipes or conduits 12, 13 and 14, whch communicate respectively with passages 15, 16 and 17 in the head, and through which pass respectively oxygen, the combustion supporting gas, and the combustible gas. The head is provided with a conical seating surface 18, having annular grooves 19 and 20. The passage 17 communicates wth the annular groove 20, the passage 16 with the annular groove 19, and the passage 15 has an orifice in the flat circular end surface of the head.

. Referring to Figures 1 and 2, a tip 21 having a single central passage 22 therethrough is secured to the head by the coupling 23, in the usual manner. The. upper end of passage 22 constitutes a conical seating surface 24, and interposed between this seating surface and the seating surface 18 of the head is a hollow cone shaped member 25, which is clamped tightly in position when the coupling 23 is manipulated to secure the tip to the head. This interposed member 25 has a plurality of grooves 26 in its outer surface, and preferably disposed, convergingly toward the tip thereof. Each of these grooves communicates by means of small openings or passages 27 with each of the annular grooves 19 and 20 in the head. It will be seen, therefore, that gases introduced into these annular grooves from the passages through the head will pass outwardly through the openings 27 into the longitudinal grooves 26, and thence downwardly into the central passage 22 of the tip. There may be any desired number of these longitudinal grooves, and it will be apparent that each groove constitutes an individual mixing passage for the gases entering the same from the annular grooves 19 and 20. The combined capacity of these individual mixing grooves may be equal to the gas conveying capacity of the supply passages in the head, and notwithstanding the fact that very large quantities of gas under high pressure may be used in the torch when heavy work is being accomplished, the same intimate mixture of the gases will take place. The tip or pointed end 25ª of member 25 extends for a considerable distance into the passage 22 for the purpose of preventing the formation of eddy currents in this passage.

In Figures 5 and 6 I have illustrated a cutting torch having the improved tip applied thereto. In this construction, member 25' has preferably a flat end 25ᵇ instead of a round or pointed end, and an opening 28 is provided therein to allow cutting oxygen to flow from passage 15 directly into the axial passage 29 in the tip. The tip is further provided with an annular gas collecting groove 30 communicating with grooves 26′ and with a plurality of ducts or conduits 22′, which convey the mixed or heating gases to the point of the tip.

It will be understood that the exact manner of forming the mixing channels in member 25 may be varied. For instance, in Figure 3 I have shown a modified form in which these channels instead of being grooves in the exterior surface, are conduits drilled or otherwise formed, intermediate its seating surfaces. In Figure 4 a further modification is shown in which the grooves extend to the very tip of the member 25, instead of terminating as in the forms illustrated in Figures 2 and 3. In Figure 7 is illustrated as applied to a welding tip, a mixing member 25⁴ which is adapted to be applied to a torch head having a plain seating surface as shown, the gas collecting grooves being formed in the mixing member.

It will be understood that the opposite conical faces of the mixing member conform to the shape of the seating surfaces of the head and tip proper respectively, and that when clamped by the coupling there will be no leakage of gas between grooves 18 and 19, or between any of the grooves 26, or between the grooves 18 and 19, and the cutting oxygen passage 29 in the form shown in Figure 2.

From the foregoing description, the operation of the device will be understood. It will be noted that by providing a large number of mixing channels, each of small cross-sectional area, a very intimate mixture of the gases is obtained and when the gases are thus mixed in proper proportion, perfect combustion and the highest efficiency are attained.

It will be evident that the invention may be embodied in numerous forms and hence, without limiting myself to the particular embodiments illustrated and described, I claim:

1. In a torch, a head having independent passages therein for gases to be mixed, in combination with a burner tip having a passage therein for mixed gases to be burned, and a member interposed between said head and tip and separate therefrom and having a groove in one face for the mixture of gases, said groove communicating with each of the passages in the head and the passage in the tip, for the purpose set forth.

2. In a torch, a head having independent passages therein for gases to be mixed, in combination with a burner tip having a passage therein for mixed gases to be burned, and a member interposed between said head and tip and separate therefrom, each of its contacting surfaces having a gas tight fit with a corresponding seating surface of the head or tip, and having a groove in that surface which abuts against the tip of the torch, the groove being provided for the mixture of gases and being in communication with the gas passages of the head and the passage in the tip.

3. In a torch, a head, having independent passages therein for gases to be mixed, in combination with a burner tip having a passage therein for mixed gases to be burned, and a member interposed between said head and tip and separate therefrom, its contacting surfaces making gas tight fits with the corresponding seating surfaces of the head and tip, and having a plurality of grooves in that surface which abuts against the tip of the torch, each of the grooves being in communication with the gas passages of the head.

4. In a torch, a head having a conical seating surface with annular grooves therein and passages for gases to be mixed, each of which terminates in one of said grooves, in combination with a burner tip having a conical seating surface and a passage therein for mixed gases to be burned, and a member interposed between said head and tip having two conical seating surfaces of the same pitch relatively to its axis adapted to abut respectively against the seating surfaces of the head and tip with gastight fits, said member having a passage therein communicating with each of the annular grooves of the head and with the passage in the tip, for the purpose set forth.

5. In a torch, a head having a projecting cone and passages for conducting gases to the conical surface thereof, a tip having a conical socket and a passage leading therefrom for mixed gases, and an intermediate conical member fitting said cone and socket and having a plurality of longitudinal mixing grooves in one face thereof communicating with the passages in the head and the passage in the tip.

6. In a torch, a head having a projecting cone and passages for conducting gases to the conical surface thereof, a tip having a conical socket and a passage leading therefrom for mixed gases, and an intermediate conical member fitting said cone and socket and having a plurality of converging longitudinal mixing passages communicating with the passages in the head and the passage in the tip.

7. In a torch, a head having a projecting cone and passages for conducting gases to the conical surface thereof, a tip having a conical socket and a passage leading therefrom for mixed gases, and an intermediate conical member fitting said cone and socket and having a plurality of converging longitudinal grooves in its outer surface communicating with the passages in the head and the passage in the tip.

8. A torch comprising a head having a conical seating surface, a burner tip having a conical seating surface, and a member separate from the head and tip and interposed therebetween, said member comprising a thin walled hollow cone having two similar coaxial conical seating surfaces, passages for the mixture of gases being provided in said member.

In testimony whereof I affix my signature.

ALEXANDER F. JENKINS.